United States Patent [19]

Wiederrich

[11] Patent Number: 4,457,165
[45] Date of Patent: Jul. 3, 1984

[54] APPARATUS AND METHOD FOR DRIVE SHAFT SIGNATURE ANALYSIS

[75] Inventor: James L. Wiederrich, Lodi, Calif.
[73] Assignee: FMC Corporation, Chicago, Ill.
[21] Appl. No.: 413,926
[22] Filed: Sep. 1, 1982
[51] Int. Cl.³ .............................................. G01M 1/10
[52] U.S. Cl. ....................................... 73/116; 73/660; 73/672
[58] Field of Search ............ 73/116, 660, 862, 862.08, 73/672, 579, 593

[56] References Cited

U.S. PATENT DOCUMENTS 4,267,733  5/1981  Shima et al. ...................... 73/660 X
4,320,662  3/1982  Schaub et al. ......................... 73/660

OTHER PUBLICATIONS

A. R. Graham, PhD thesis, University of Iowa ("The Dynamic Behavior of a Mechanism . . . ", in the period 1964–1970).
Tricamo, S. J., and Lowen, G. G., "A New Concept for Force Balancing Machines for Planar Linkages, Part I: Theory; Part II: Application to Four-Bar Linkage and Experiment" ASME Journal of Mechanical Design, vol. 103, No. 3, Jul. 1981, pp. 637–643 and vol. 103, No. 4, Oct. 1981, pp. 784–793, respectively.
Dubowsky, S., Maatuk, J., and Perreira, N. D., "A Parameter Identification Study of Kinematic Errors in Planar Mechanisms," ASME Journal of Engineering for Industry, vol. 97, No. 2, May 1975, pp. 635–642.

Primary Examiner—Jerry W. Myracle
Attorney, Agent, or Firm—H. M. Stanley; R. B. Megley

[57] ABSTRACT

The dynamic properties of a machine are defined by its kinetic energy, potential energy and dissipation functions. The machine is also identifiable by the nonviscous friction therein. These properties form the basis for the dynamic analysis of any machine. When the response of a single degree of freedom machine is observed while being driven by a forced periodic input torque, information is obtained whereby these functions together with the nonviscous friction characteristic may be determined. The apparatus and method by which such determinations may be made have applications in machinery development, quality control and diagnosis.

12 Claims, 4 Drawing Figures

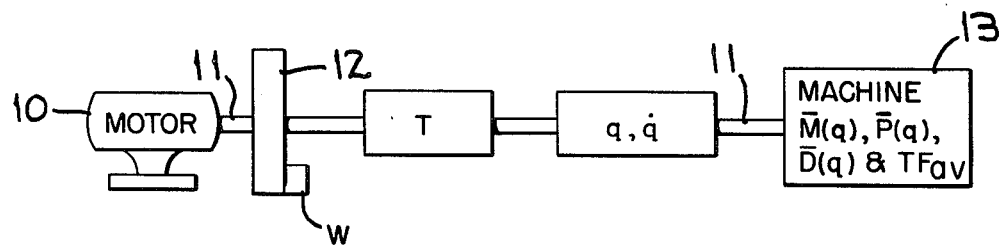
FIG_1
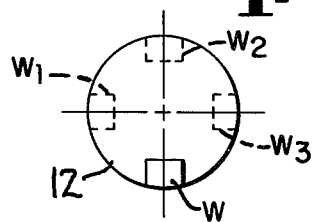
FIG_1A
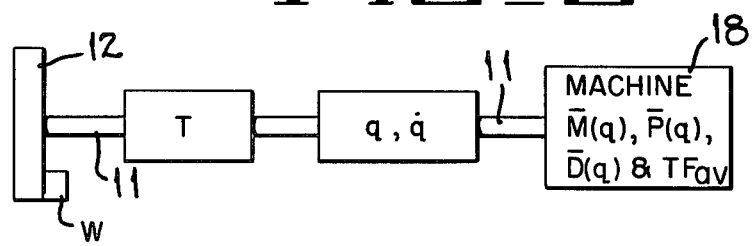
FIG_3
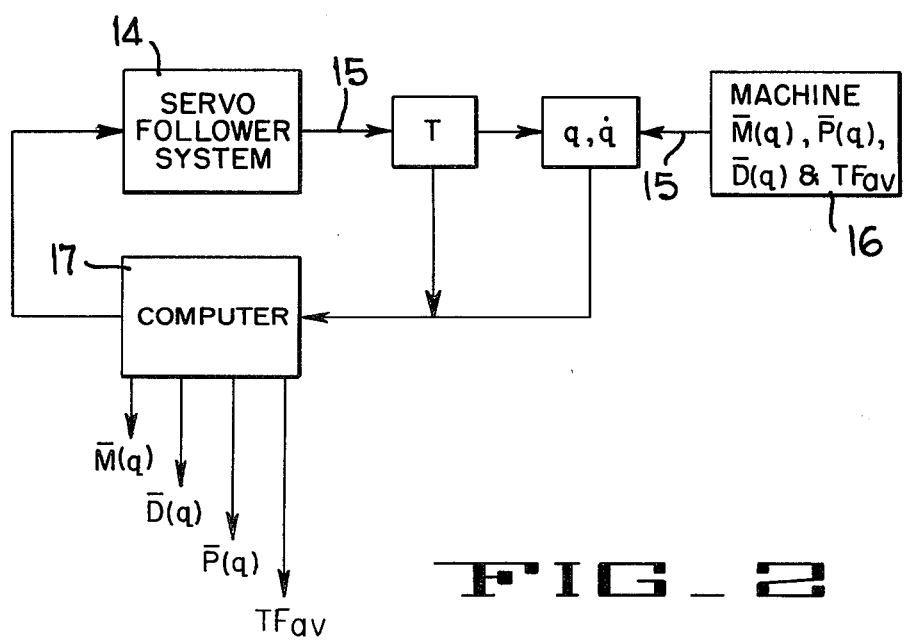
FIG_2

APPARATUS AND METHOD FOR DRIVE SHAFT SIGNATURE ANALYSIS

BACKGROUND OF THE INVENTION

1. Field of the Invention

The apparatus and method disclosed herein relates to machinery identification, and more particularly to such identification as it supports machinery development, characteristic control and diagnosis.

2. Description of the Prior Art

The general form of the nonlinear differential equation governing the motion of any single degree of freedom holonomic system is known. The holonomic characteristic as defined in the text entitled Dynamics, authored by Thomas R. Kane, published by Holt, Rinehart, and Winston, Inc., copyright 1968, pages 13–15. The relationship can form the basis for obtaining information in several ways. Given the system parameters and a desired response, the required input may be determined. Given the input and the desired response, the required system parameters may be determined. Given the system parameters and the input, the resulting response may be determined. If the input and the response are measured, the system parameters may be determined. However, the utility of the latter approach, identification of system parameters, has not been fully recognized. Available literature concentrates on either determining the required input to the system given the system parameters and response, determining the resulting response given the system parameters and the input thereto, or optimization of the system parameters given the input and the desired response. Nonetheless, a recent work relates to experimentally improving the balancing of a mechanism through a form of mechanism identification. Tricamo, S. J., and Lowen, G. G., "A New Concept for Force Balancing Machines for Planar Linkages. Part I: Theory; Part II: Application to Four-Bar Linkage and Experiment" ASME Journal of Mechanical Design, Vol. 103, No. 3, July 1981, pp. 637–643 and Vol. 103, No. 4, Oct. 1981, pp. 784–793, respectively. In this work it was found that crank shaft speed variations could not be ignored. A theory for identification of sources of kinematic errors in planar mechanisms was presented by Dubowsky, S., Maatuk, J., and Perreira, N. D., "A Parameter Identification Study of Kinematic Errors in Planar Mechanisms," ASME Journal of Engineering for Industry, Vol. 97, No. 2, May 1975, pp. 635–642. However, it is believed that no formulation has at yet been presented for machine identification based upon the measured drive shaft speed and torque variations for dynamic systems having large displacements.

SUMMARY OF THE INVENTION

Apparatus is disclosed for driving a single degree of freedom holonomic mechanical system and for sensing system characteristics, comprising a drive motor having an output drive shaft, means for providing a periodic synchronous oscillation on the output drive shaft, means for sensing the periodic torque T coupled to the output drive shaft, means for detecting drive shaft angular position q coupled to the output drive shaft, and means for obtaining the drive shaft angular speed $\dot{q}$ within the system. Through the use of the foregoing apparatus the system kinetic energy coefficient M, potential energy P, viscous damping coefficient D and total nonviscous friction TF characteristics may be described.

In accordance with the method disclosed herein the mechanical characteristics of a single degree of freedom holonomic mechanical system may be identified wherein a drive shaft is accessable in the system through which the system may be driven. The method includes driving the drive shaft with a known oscillatory steady state rotational driving input and measuring the drive shaft torque. Shaft angular position is determined together with drive shaft speed. The kinetic energy, potential energy and dissipation functions which define the coefficients of the terms in a general equation of motion for the system, and which are linear coefficients in the equation of motion, are expanded as separate Fourier series. At least two independent observations corresponding to two different steady state operating conditions are made of the system response, whereby a deterministic total set of equations is obtained to provide information allowing determination of the three functions descriptive of the aforementioned linear coefficients. Three independent observations are required if TF is nonzero.

Another embodiment of the apparatus disclosed herein is utilized for sensing the characteristics of a single degree of freedom holonomic mechanical system having a contained power source coupled to a system output drive shaft. The apparatus includes means for providing a synchronous periodic oscillation on the output drive shaft and means for sensing the periodic oscillation torque coupled to the output drive shaft. Means for detecting drive shaft angular position and for obtaining drive shaft angular speed are coupled to the output drive shaft. As a result system kinetic energy, potential energy, viscous damping and total nonviscous friction characteristics may be described.

In accordance with an alternate method disclosed herein the mechanical characteristics of a single degree of freedom holonomic mechanical system may be identified wherein the system has an output drive shaft coupled to a contained power source within the system. The method includes the steps of driving the output drive shaft, imposing a known oscillatory steady state rotational input on the drive shaft and measuring the drive shaft torque. Further steps include determining the shaft angular position and speed, expanding the kinetic energy coefficient, potential energy and dissipation coefficient functions in a general equation of motion for the system as separate Fourier series. At least two independent observations are made at two different steady state driving inputs, whereby a deterministic total set of equations is obtained to thereby allow for determination of the three functions descriptive of the linear coefficients of the terms in the general equation of motion.

BRIEF DESCRIPTION OF THE DRAWINGS

FIG. 1 is a mechanical schematic of one embodiment of the present invention.

FIG. 1A is a detail of the flywheel in FIG. 1.

FIG. 2 is a block diagram of another embodiment of the present invention.

FIG. 3 is a block diagram of yet another embodiment of the present invention.

DESCRIPTION OF THE PREFERRED EMBODIMENTS

Identification of the characteristics of a machine or mechanical system involves experimentally measuring the input to the machine and the machine response and determining the machine or system parameters therefrom. Identification is the inverse process of system analysis, wherein the system parameters and input are given and the resulting system response is determined. The importance of identification is that it may serve to provide a formal means for evaluating the validity of assumptions which are inherent in the governing equations for a machine or system. It may be said that identification provides a "signature" from which changes in the system might thereby be identfied. Further important points here are that the "signature" is independent of operating speed and that the "signature" categorizes the operating effects into three functions. The invention disclosed herein involves apparatus and method wherein machine identification is based upon measured drive shaft speed and torque variations wherein the identification is made for a dynamic system having large displacements.

FIG. 1 is a schematic diagram showing a motor 10 having an output shaft 11 on which is mounted a flywheel 12 having an eccentric weight W which is positionable about the periphery of the flywheel. The shaft is coupled to a torque sensor T which is in turn coupled to a device for measuring shaft angle q and shaft rotational speed $\dot{q}$. A single degree of freedom holonomic system or machine 13 is driven by the shaft. The machine has individual characteristics which relate to kinetic energy coefficient M, viscous dissipation coefficient D and potential energy P, all of which may be expressed, due to the limitations on the machine expressed hereinafter, in terms of the angle variable q. The machine may also have characteristics related to nonviscous friction TF, such as Coulomb friction. The flywheel in FIG. 1 with the attached eccentric weight W is present to provide a steady state periodic oscillatory motion on the drive shaft coupled to the machine. The weight may be positioned peripherally in any of a number of different positions on the flywheel, as seen in dashed lines in FIG. 1A at W1, W2 or W3 for example, to provide for different independent operating or driving conditions for the machine 13.

The motion of any single degree of freedom holonomic system or machine may be defined by a mathematical relationship. The type of machines to be considered by the relationships recited herein are restricted by the following assumptions:

1. The kinetic energy portion of the equation of motion is a homogeneous quadratic function of $\dot{q}$, shaft angular speed.
2. The system can be observed at several steady state average operating conditions.
3. q is a monotonic function, $\dot{q}$ is not equal to zero.
4. At each steady state average operating condition $\dot{q}$ is a forced periodic function, $\dot{q}(q)$.
5. All unknown active forces are representable by suitable kinetic, potential and dissipation functions, which may include a constant term representing the nonviscous friction.

The aforementioned kinetic energy, potential energy and dissipation functions may be expressed as follows:
$M(q)\dot{q}^2$ is the kinetic energy
$P(q)$ is the potential energy
$D(q)\dot{q}^2/2$ is the dissipation function
$T(q)$ is the effective drive torque as a function of q at observed steady state average operating conditions at the shaft.

The functions M(q), D(q) and P(q) are coefficients of terms in the general equation of motion for a single degree of freedom holonomic mechanical system. The functions aforementioned are linear coefficients in the equation of motion although the terms themselves are nonlinear in q. It is the recognition of this property as well as the use to which it may be put which forms part of the invention disclosed herein.

It is assumed, in keeping with the restrictions placed on the system being analyzed, that for each steady state operating condition, $\dot{q}$ is a function of q alone and there is therefore no explicit dependence of T on $\dot{q}$ or t (time) at a steady state average operating speed. It may therefore be shown that one representation of an idealized model of the equation of motion for the type of system under consideration here is:

$$\frac{[d(M\dot{q}^2)]}{dq} + D\dot{q} + P' = T$$

Where P' = dP/dq

The immediately foregoing equation is also a statement of conservation of energy. Further modification of the aforementioned equation of motion results in the following, where quantites having a bar associated therewith (i.e., $\bar{P}(q)$ ) include unknown effects arising from departure from the idealized single degree of freedom, such as nonviscous friction represented by TF(q) (Such unknown effects are assumed small compared to other terms in the general equation of motion recited herein.):

$$\frac{d(\bar{M}\dot{q}^2)}{dq} + \bar{D}\dot{q} + \bar{P} = T \tag{1}$$

Where:

$$\bar{P}(q) = P'(q) + TF(q)$$

$$TF(q) = TF_{av} + FF(q)$$

$$TF_{av} = \frac{1}{2\pi} \int_0^{2\pi} TF(q)dq.$$

Where $TF_{av}$ is the average value of TF (q) in any single period and FF(q) is the oscillatory portion of TF(q).

As mentioned hereinbefore, equation (1) is linear in the unknown functions $\bar{M}$, $\bar{D}$ and $\bar{P}$ while T and $\dot{q}$ can be observed and $\dot{q}^2$ can be calculated. Each observation of the system is here defined to be a measurement of T(q) and $\dot{q}(q)$ at a different steady state average operating condition. T(q), $\dot{q}(q)$ and $\dot{q}^2(q)$ will change with the average operating condition, but at each such observed steady state operating condition they will be unique stationary measurable periodic functions of q while $\bar{M}(q)$, $\bar{P}(q)$, and $\bar{D}(q)$ are independent of the operating condition. Thus, each observation of the system provides additional information about the aforementioned three unknown functions.

For a particular observed steady state average operating condition, each of the functions serving as coefficients of terms in equation (1) can be expanded as a Fourier series as follows:

$$\left.\begin{aligned}
T &= \frac{TC_o}{2} + \sum_{n=1} (TC_n\cos nq + TS_n\sin nq) \\
\dot{q} &= \frac{QC_o}{2} + \sum_{n=1} (QC_n\cos nq + QS_n\sin nq) \\
\dot{q}^2 &= \frac{RC_o}{2} + \sum_{n=1} (RC_n\cos nq + RS_n\sin nq) \\
\overline{M} &= \sum_{n=0} (MC_n\cos nq + MS_n\sin nq) \\
\overline{D} &= \sum_{n=0} (DC_n\cos nq + DS_n\sin nq) \\
\overline{P} &= \sum_{n=1} n(PS_n\cos nq - PC_n\sin nq) + TF_{av}
\end{aligned}\right\} \quad (2)$$

The Fourier series expansion of equation (1) is as follows:

$$\left.\begin{aligned}
\frac{1}{2\pi} \int_0^{2\pi} &\left[ \frac{d(\overline{M}\dot{q}^2)}{dq} + \overline{D}\dot{q} + \overline{P} \right] \cos mq\, dq \\
&= \frac{TC_m}{2}, \text{ where } m = 0, 1, \ldots \\
\frac{1}{2\pi} \int_0^{2\pi} &\left[ \frac{d(\overline{M}\dot{q}^2)}{dq} + \overline{D}\dot{q} + \overline{P} \right] \sin mq\, dq \\
&= \frac{TS_m}{2}, \text{ where } m = 1, 2, \ldots
\end{aligned}\right\} \quad (3)$$

Substituting (2) into (3) provides an expanded linear set of equations in unknown coefficients MC, MS, DC, DS, PC, PS and $TF_{av}$ where C relates to even functions and S relates to odd functions of q. (See Appendix A.)

Each observation of the system 13 at a different steady state operating condition provides an additional set of independent equations (3). A minimum of three such observations is necessary in order to obtain a deterministic set of n equations in n unknowns to solve for the coefficients which define the functions $\overline{M}$, $\overline{D}$, and $\overline{P}$. The value $TF_{av}$ is part of the $\overline{p}$ function. A minimum of two observations is adequate if $TF_{av}$ is negligible.

Other ways of obtaining different steady state average operating conditions in the system and therefore independent observations or equations therefrom, include using different drive motors having different drive shaft oscillatory characteristics, or controlling the drive motor output shaft characteristics by selectively controlling the motor excitation. (The oscillation is synchronous with the rotational frequency of the drive shaft.) The last named means for attaining different steady state average operating conditions at the drive shaft may be described in conjunction with FIG. 2 of the drawings. A servo follower system 14 as described in Clark, R. N., *Introduction To Automatic Control Systems*, John Wiley and Sons, Inc., 1962, page 170, includes a motor and a feed back loop which drives a shaft 15 wherein a torque sensor T, an angular position sensor q and an angular velocity sensor $\dot{q}$ are incorporated. The angular velocity may be computed by monitoring the angular position sensor. A machine (mechanical system) 16 is driven by the shaft 15. The torque, angular position and angular velocity quantities are coupled to a computer 17 which in turn is coupled to the servo follower system. The computer is programmed to inject different operating conditions into the servo follower for defined periods (to obtain steady state conditions) so that the independent equation sets (3) may be obtained. A new set of harmonics for a given set of cycles of the drive shaft is in effect injected into the motor drive computer so that a periodic steady state driving function is provided which creates conditions which allow construction of the independent equation sets by the computer 17 as indicated at $\overline{M}(q)$, $\overline{D}(q)$, $\overline{P}(q)$ and $TF_{av}$ (where as noted hereinbefore $TF_{av}$ is included in $\overline{P}$) in FIG. 2.

If the dynamic characteristics of the prime mover in the system, seen as the motor 10 in FIG. 1, can be represented by functions of the form M(q), P(q) and D(q) as disclosed herein (for example, $T = f(q)\dot{q}$), then such a system may be represented by the block diagram of FIG. 3. FIG. 3 is seen to be substantially the same as FIG. 1 with the deletion of the drive motor or prime mover 10 for the system. A machine 18 of this type is shown in FIG. 3 wherein the rotation of the shaft is accomplished by a power source within the machine 18 (for example an internal combustion engine complying with the limitations set herein) and the angle and angular speed sensing (for q and $\dot{q}$) as well as the torque sensing (T) is undertaken as disclosed hereinbefore. The shaft 11 is also seen to be subjected to a periodic steady state load as imposed, for example, by the flywheel 12 carrying the eccentric weight W. All that has been disclosed hereinbefore and all of the relationships set forth in this disclosure apply with equal force to the embodiment of FIG. 3. Further, if the dynamic characteristics of the prime mover cannot be represented by the functions disclosed herein, and they can be represented by suitable functions of a known form, these latter functions may be substituted in the equation of motion and the system may be identified completely as described herein.

APPENDIX A: EXPANSION OF EQUATION 3

Substituting equation (2) into equation (3) and considering the special case of $TF_{av}$ equal to zero one obtains the following, collectively equation A1:

(A1a)
$$\sum_{n=0} [m(RS_{m+n} + RS_{m-n})MC_n - m(RC_{m+n} - RC_{m-n})MS_n +$$

$$(QC_{m+n} + QC_{m-n})DC_n + (QS_{m+n} - QS_{m-n})DS_n] +$$

$$2mPS_m = 2TC_m, \, m = 0, 1, \ldots$$

(A1b)
$$\sum_{n=0} [-m(RC_{m+n} + RC_{m-n})MC_n - m(RS_{m+n} - RS_{m-n})MS_n +$$

$$(QS_{m+n} + QS_{m-n})DC_n - (QC_{m+n} - QC_{m-n})DS_n] -$$

$$2mPC_m = 2TS_m, \, m = 1, 2, \ldots$$

Equation (A1) is a linear set of equations in the unknown coefficients MC, MS, DC, DS, PC, PS. This can be an infinite set of equations, but acceptable results can be obtained from a finite truncated subset of these equations. The number of terms which must be retained is dependent on the rate of convergence of the Fourier series coefficients.

Each observation of the system at a different steady state average operating speed provides an additional set of equations of the form of equation (A1). If m and n are limited such that $m \leq u$ and $n \leq v$, then each such set consists of $2u+1$ equations in the $4v+2u+2$ unknowns ($MC_o$, ..., $MC_v$, $MS_1$, ..., $MS_v$, $DC_o$, ..., $DC_v$, $DS_1$, ..., $DS_v$, $PC_1$, ..., $PC_u$, and $PS_1$, ..., $PS_u$). Let w be the number of observations. In order that the total set of equations be deterministic it is necessary that $$w(2u+1)=4v+2u+2$$

where w, u and v are all integers. It follows that a minimum of two observations, (i.e., $w \leq 2$), are required with $v=u/2$. For $w>2$ the problem is over specified but can be solved in a least squares sense.

For $TF_{av}$ not equal to zero equation (A1) is unchanged except that for m=o the zero term $2m\ PS_m$ on the left hand side of equation (A1a) is replaced by 4 $TF_{av}$. Each equation set then consists of $2u+1$ equations in $4v+2u+3$ unknowns ($MC_o$, ..., $MC_v$, $MS_1$, ..., $MS_v$, $DC_o$, ..., $DC_v$, $DS_1$, ..., $DS_v$, $PC_1$, ..., $PC_u$, $PS_1$, ..., $PS_u$, and $TF_{av}$). In order that the total set of equations be deterministic it is necessary that $$w(2u+1)=4v+2u+3$$

where w is the number of observations and w, u and v are all integers. It follows that a minimum of three observations (i.e., $w \geq 3$) are required with $v=u$.

Although the best mode contemplated for carrying out the present invention has been herein shown and described, it will be apparent that modification and variation may be made without departing from what is regarded to be the subject matter of the invention.

What is claimed is:

1. Apparatus for driving a single degree of freedom holonomic mechanical system and for sensing system characteristics, comprising a drive motor having an output drive shaft, means for providing a synchronous periodic oscillation on said output drive shaft, means for sensing said periodic oscillation torque T coupled to said output drive shaft, means for detecting drive shaft angular position q coupled to said output drive shaft, means for obtaining drive shaft angular speed q̇ within the system, whereby said system kinetic energy, potential energy, viscous damping, and total nonviscous friction characteristics may be described.

2. Apparatus as in claim 1 wherein said means for providing a periodic oscillation comprises a flywheel mounted on said output shaft, and an eccentric weight attached to said flywheel.

3. Apparatus as in claim 1 wherein said means for providing a periodic oscillation, comprises a computer coupled to said means for sensing T, detecting q and obtaining q̇ and operating to excite said drive motor to provide a predetermined periodic torque oscillation in said output drive shaft in response thereto and providing linear relationships descriptive of the kinetic energy, potential energy, viscous damping and total nonviscous friction characteristics.

4. Apparatus as in claim 1 together with means for receiving T, q and q̇ and for providing linear relationships descriptive of the kinetic energy, potential energy, viscous damping and total nonviscous friction characteristics for distinct forms of said periodic torque oscillation.

5. A method of identifying the mechanical characteristics of a single degree of freedom holonomic mechanical system having a drive shaft through which the system may be driven, comprising the steps of driving the drive shaft with a known oscillatory steady state rotational driving input, measuring the drive shaft torque, determining shaft angular position and speed, expanding the kinetic energy coefficient, potential energy and dissipation coefficient functions in a general equation of motion for the system as separate Fourier series, and making at least two independent observations at two different steady state driving inputs, whereby a deterministic total set of equations is obtained to thereby allow for determination of the Fourier series coefficients which define the three functions descriptive of the coefficients of the terms in the general equation of motion.

6. A method as in claim 5 together with the steps of making at least one additional independent observation at another different steady state driving input, and determining the value of total nonviscous friction torque in the system from the at least three independent observations.

7. Apparatus for sensing the characteristics of a single degree of freedom holonomic mechanical system having a contained power source coupled to a system output drive shaft, comprising means for providing a synchronous periodic oscillation on the output drive shaft, means for sensing said periodic oscillation torque T coupled to the output drive shaft, means for detecting drive shaft angular position q coupled to the output drive shaft, means for obtaining drive shaft angular speed q̇ within the system, whereby said system kinetic energy, potential energy, viscous damping and total nonviscous friction characteristics may be described.

8. Apparatus as in claim 7 wherein said means for providing a periodic oscillation comprises a flywheel mounted on said output shaft, and an eccentric weight attached to said flywheel.

9. Apparatus as in claim 7 wherein said means for providing a periodic oscillation, comprises a computer coupled to said means for sensing T, detecting q and obtaining q̇ and operating to excite said drive motor to provide a predetermined periodic torque oscillation in said output drive shaft in response thereto and providing linear relationships descriptive of the kinetic energy, potential energy, viscous damping and total nonviscous friction characteristics.

10. Apparatus as in claim 7 together with means for receiving T, q and q̇ and for providing linear relationships descriptive of the kinetic energy, potential energy, viscous damping and total nonviscous friction characteristics for distinct forms of said periodic torque oscillation.

11. A method of identifying the mechanical characteristics of a single degree of freedom holonomic mechanical system having an output drive shaft coupled to a contained power source within the system, comprising the steps of driving the output drive shaft, imposing a known oscillatory steady state rotational input on the driven shaft, measuring the drive shaft torque, determining shaft angular position and speed, expanding the kinetic energy coefficient, potential energy and dissipation coefficient functions in a general equation of motion for the system as separate Fourier series, and making at least two independent observations at two different steady state driving inputs, whereby a deterministic total set of equations is obtained to thereby allow for determination of the three functions descriptive of the linear coefficients of the terms in the general equation of motion.

12. A method as in claim 11, together with the steps of making at least one additional independent observation while imposing a different oscillatory steady state rotational input, and determining the value of total nonviscous friction torque in the system from the at least three independent observations.

* * * * *